United States Patent [19]

Weishaupt

[11] Patent Number: 4,563,988
[45] Date of Patent: Jan. 14, 1986

[54] APPARATUS FOR DETERMINING THE FILLING QUANTITY OF LUBRICATING OILS IN DRIVE INSTALLATIONS

[75] Inventor: Walter Weishaupt, Munich, Fed. Rep. of Germany

[73] Assignee: Bayerische Motoren Werke AG, Fed. Rep. of Germany

[21] Appl. No.: 528,635

[22] Filed: Sep. 1, 1983

[30] Foreign Application Priority Data

Sep. 1, 1982 [DE] Fed. Rep. of Germany ....... 3232465

[51] Int. Cl.⁴ .............................................. F01M 1/00
[52] U.S. Cl. .................................. 123/196 S; 184/6.4; 184/103.1
[58] Field of Search ..................... 123/196 R, 196 S; 184/6.4, 103 R

[56] References Cited

U.S. PATENT DOCUMENTS 2,836,259 5/1958 Norton ............................ 184/103 R
3,876,037 4/1975 Rath, Jr. .............................. 123/6.4
3,882,967 5/1975 Gulla et al. ..................... 184/103 R
4,091,895 5/1978 Lang ................................ 184/103 R
4,105,092 8/1978 Zeidler et al. ....................... 184/6.4
4,299,307 11/1981 Scott ............................... 184/103 R
4,306,525 12/1981 Faxvoy ........................... 123/196 S
4,453,511 6/1984 Pluequet .......................... 123/196 S

FOREIGN PATENT DOCUMENTS 536812 10/1931 Fed. Rep. of Germany .
1222511 8/1966 Fed. Rep. of Germany .
2117167 11/1971 Fed. Rep. of Germany .
2308370 9/1974 Fed. Rep. of Germany .
2364532 6/1983 Fed. Rep. of Germany .

Primary Examiner—E. Rollins Cross
Attorney, Agent, or Firm—Craig and Burns

[57] ABSTRACT

An apparatus for determining the filling quantity of lubricating oils in drive installations comprising a timing member which activates a filling level pickup only after a predetermined time of several minutes following the shutoff of the drive installation, this pickup yielding an output signal only if two superimposed sensing elements transmit different responses. This provides a precise information regarding the actual quantity of lubricating oil. The output signal may be dependent upon an operating temperature cyclic filling may be effected at appropriate timed periods.

7 Claims, 1 Drawing Figure

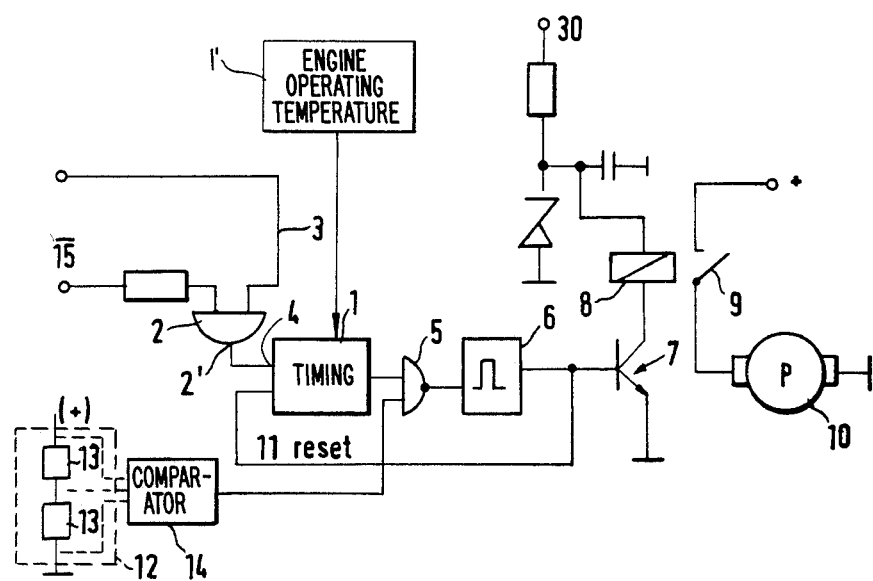

APPARATUS FOR DETERMINING THE FILLING QUANTITY OF LUBRICATING OILS IN DRIVE INSTALLATIONS

BACKGROUND OF THE INVENTION

The invention relates to an apparatus for determining the filling quantity of lubricating oils in drive installations.

Such determinations are effected nowadays in the form of a filling level determination, usually manually with the aid of a dipstick. It is furthermore known to determine the filling level automatically with the aid of electrical pickup elements, in particular, which operate capacitively or with the use of a hot-wire element. In this case, determination takes place either during operation or directly at the completion of operation of the drive installation. Both possibilities exhibit the drawback that they yield an entirely inadequate picture of the actually existing amount of lubricating oil. The reason for this is that the lubricating oil is still within the lubricating oil cycle during and at the end of operation, and the filling level normally present in a collecting vessel simulates an oil quantity that is too low. Frequently, the lubricating oil level is, in this case, brought to the seemingly correct, but in reality excessive level by replenishing lubricating oil. The use of a pickup means having only one sensor, in a single hot-wire element, for example, moreover has the disadvantage that no distinction can be made between the condition of having an oil level that is below the desired or minimum filling level due to oil loss, and the condition of having such an oil level due to an inclined positioning of the automotive vehicle.

A feature of the invention is the provision of an apparatus of the type discussed above permitting a reliable indication of the actual lubricating oil quantity.

This is attained by providing that a timing member activates a filling level pickup after a predetermined time of several minutes following the shut-off of the drive installation; that the filling level pickup comprises two sensing elements arranged in proximity to each other, one above the other; and that an output signal for an abnormal filling level is transmitted if the two sensing elements yield differing responses.

The invention is based on the fact that the lubricating oil level reaches its original value only a certain time after end of operation of the drive installation—assuming that no losses have occurred. Only thereafter is the filling level to be determined. A loss of lubricating oil can be recognized in a simple way only at this point in time. An unambiguous indication is achieved by use of the two sensing elements, since, in case of an inclined positioning of the automotive vehicle, both sensing elements are immersed or have emerged, and respond identically.

The invention can be realized in a great variety of ways. Thus, it is possible, for example, to provide that the timing member has a constant switching time. This version is distinguished by special simplicity.

In contrast thereto, improved adaptation to the course of the lubricating oil level is obtained after the end of operation of the drive installation if the predetermined time period is dependent on an operating temperature of the drive installation. This can be, for example, the temperature of the coolant or of the lubricating oil proper. In this way, the factor can be taken into account that lubricating oil exhibits varying viscosity at different temperatures, and the original filling level, assuming no losses have occurred, will be reached at different times. By this adaptation of the switching time of the timing member, it becomes possible to determine the lubricating oil level, independently of the temperature of the lubricating oil, at approximately the instant at which it should have attained the original value. This determination thus takes place relatively frequently precisely in instances of successive short-term operations of the drive installation and offers assurance that a lubricating oil loss can be definitely recognized.

A thus-recognized loss can be compensated for in various ways. On the one hand, with the aid of the filling level pickup signal, an optical indication can be made showing the necessity for replenishing lubricating oil. However, the pickup signal can also be applied to a conventional lubricating oil replenishing device.

By means of such a device, the lubricating oil level can be automatically brought to the required level. The mode of operation of this device can be such that in all cases a definite amount is refilled. In this connection, one of the basic ideas of the invention can be utilized, namely to consider temporal characteristics of the lubricating oil. This characteristic has the consequence that, within the same time period, depending upon the temperature, a different amount of lubricating oil is being replenished. In order always to obtain the same amount of refill, it is thus advantageous to control the time period during which lubricating oil is being replenished in dependence on the temperature. Such replenishment can be effected with the aid of a conventional lubricating oil pump.

The amount being replenished can be dimensioned so small that overfilling is excluded with maxiumum safety. Such a small amount of refill, however, has the result that the required lubricating oil level frequently is not attained with a single refilling step. In this case, refilling is to be performed iteratively. A filling level determination after a preceding refilling step is carried out at regular time intervals until the required lubricating oil level has been reached. These successive filling level determinations are likewise to be executed at a predetermined temporal interval in order to obtain, with relatively little expense, a precise information on the actually present amount of lubricating oil. For this purpose, again, the timing member can be utilized, controlling the successive refilling operations.

SUMMARY OF THE INVENTION

It is thus an object of the invention to provide an apparatus for determining the filling quantity of lubricating oils in drive installations which provides a reliable indication of the actual lubricating oil quantity.

It is another object of the invention to provide apparatus for determining the filling quantity of lubricating oils in drive installations wherein a timing member is activated after a predetermined time period of several minutes following the shutoff of the drive installation and a filling level pickup is provided comprised of two sensing elements arranged in mutual proximity one above the other and there is provided means for transmitting an output signal for an abnormal filling condition if the two sensing elements show differing responses.

It is another object of the invention to provide apparatus for determining the filling quantity of lubricating oils in drive installations, the apparatus being provided with a timing member to signal an abnormal filling condition employing a constant time period for the timing member.

It is another object of the invention to provide apparatus for determining the filling quantity of lubricating oils in drive installations wherein a timing member signals abnormal filling conditions, the time period of the timing member being dependent on an operating temperature of the drive installation.

It is another object of the invention to provide an apparatus for determining the filling quantity of lubricating oils in drive installations, the apparatus having a filling level pickup comprised of two sensing elements arranged in mutual proximity one above the other with means for transmitting an output signal for an abnormal filling condition if the two sensing elements show differing responses, a lubricating oil refilling device and means for transmitting the output signal of the filling level pickup to control the lubricating oil refilling device.

It is another object of the invention to provide an apparatus for determining the filling quantity of lubricating oils in a drive installation, the apparatus having a timing member activated after a predetermined time period of several minutes following the shutoff of the drive installation, a filling level pickup comprising two sensing elements arranged in mutual proximity one above the other, means for transmitting an output signal for an abnormal filling condition if the two sensing elements show differing responses, a lubricating oil refilling device and means for transmitting the output signal of the filling level pickup to control the lubricating oil refilling device, and means for controlling in response to the timing member, the refilling after a preceding refilling step.

BRIEF DESCRIPTION OF THE DRAWING

These and other objects, features, and advantages of the present invention will become more apparent from the following description when taken in connection with the accompanying drawing which shows, for the purposes of illustration only, one embodiment in accordance with the present invention, and wherein:

DESCRIPTION OF THE PREFERRED EMBODIMENT

A drive installation, preferably for automotive vehicles, in the form of an internal combustion engine or a transmission, contains a lubricating oil refilling device which replenishes the lubricating oil after a predetermined time of, for example, 8 minutes, following the shutoff, if such replenishment is necessary. This takes place with the aid of a pump 10, the control circuit of which is shown in detail.

The control circuit comprises, as the central element, a timing member 1 which changes its output signal 8 minutes after its activation. Activation takes place via an AND member 2 connected to the ignition circuit 15 and to the oil-pressure testing circuit 3. The output 2' of the AND member 2 is connected with one input 4 of the timing member 1.

The output signal from the timing member 1 is transmitted via a NAND member 5 to a monostable multivibrator 6, which latter controls a power transistor 7. The coil of a relay 8 is connected in the collector circuit of this transistor; the working contact 9 of this relay controls the lubricating oil pump 10.

The monostable multivibrator 6 has a switching time of, for example, 20 seconds. The pump 10 delivers during this time, for example, an amount of oil of about 0.1 liter when the internal combustion engine is at operating temperature. The output signal from the monostable multivibrator 6 is furthermore transmitted to a reset input 11 of the timing member 1. Furthermore, a filling level pickup 12 is connected to the NAND member 5, this pickup being illustrated schematically. This pickup comprises two sensing elements, for example, in the form of two hot-wire elements 13, which are arranged in superimposed position one above the other, for example, alongside and/or in place of a usually present dipstick. If these elements are supplied with current in a definite fashion, their resistance characteristic is dependent on whether they are immersed in oil. Differing resistance values reveal that one of the two elements has emerged, and lubricating oil must be refilled. The resistances of the two elements can be compared in a simple way, for example, with the aid of a comparator 14, and can be converted into an output signal for the NAND member 5.

Approximately 8 minutes after the drive installation has been shut off—the two input signals of the AND member 2 change upon shutoff, or immediately after shutoff—the timing member 1 also changes its output signal and thus activates the filling level pickup 12 for the lubricating oil. At this point in time, the oil level, due to the oil returned thus far from the circulation, has reached a value making it possible to provide precise information on the actual, total oil quantity. If this oil level lies above or below the predetermined minimum level, then the NAND member 5 does not change its output signal. However, if such level lies at or in the proximity of the minimum level, then the NAND member changes its output signal. The monostable multivibrator 6 activates the pump 10 for 20 seconds by way of the control transistor 7. At the same time, the timing member 1 is reset. The minimum level lies precisely in between the two levels at which the sensing elements are located.

If the replenishing amount supplied is sufficient to exceed the minimum level, then no further refilling step is executed. However, if the amount is inadequate, then another refilling step is performed after another 8 minutes. The circuit operation here progresses as during the shutoff of the drive installation. Eight minutes after the reset signal at input 11 and with the drive installation remaining shut down—the input 4 is then still activated by the AND member 2—the timing member 1 and the NAND member 5, which latter is activated by the pickup 12 below or at minimum level of the lubricating oil, again actuate the monostable multivibrator 6 and thus the pump 10. This iterative refilling operation is continued until the minimum level is exceeded.

The time, following shutting off of the drive installation and/or refilling of lubricating oil, after which a (renewed) refilling step is performed can also be adapted, for example, to an operating temperature sensed at 1'. For instance, in place of the timing member 1 with constant switching time—in the illustrated case of 8 minutes—it is possible to connect several timing members with a switching time of, for example, two minutes, in series; these timing members are activated and/or bridged in correspondence with the operating temperature—for example the temperature of the lubricating oil and/or of a coolant.

In the same way, the activating time for pump 10 can be varied and/or can be adapted so that the amount replenished is constant at all times, independently of the actual lubricating oil temperature sensed at 1'. In this case, for example, a series connection of several monostable multivibrators of the type of the monostable multivibrator 6 is to be provided, which multivibrators are activated and/or bridged in correspondence with the lubricating oil temperature.

In any event, the invention provides an especially simple and effective apparatus for filing level determination and/or correction for the lubricating oil of a drive installation, making it possible to render precise information on the actual quantity of lubricating oil and, in conjunction with a refilling device, precludes overfilling.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed is:

1. Apparatus for determining the fill quantity condition of lubricating oils in an internal combustion engine having an oil sump comprising
   a fill level pickup comprising two sensing elements wired in series one physically located above the other in the oil sump,
   a timing member activated, after a predetermined time period of several minutes following the shut-off of said internal combustion engine,
   means responsive to the timing member and fill level pickup for transmitting an output signal indicative of an abnormal fill condition if the two sensing elements show differing responses, said responsive means control lubricating oil refilling device.

2. Apparatus according to claim 1, wherein the predetermined time period is constant.

3. Apparatus according to claim 1, wherein the predetermined time period is dependent on an operating temperature of said engine.

4. Apparatus according to claim 1, wherein the refilling device supplies a defined amount of lubricating oil if the output signal is present.

5. Apparatus according to claim 1, wherein the timing member comprises
   a reset means, and
   means for controlling refilling after the preceding refilling step.

6. Apparatus according to claim 1, further comprising means responsive to said engine operating temperature for varying the time period after which the timing member is activated.

7. Apparatus according to claim 1, further comprising means for controlling the means for transmitting the output signal in response to the magnitude of the temperature of the lubricating oil.

* * * * *